(12) United States Patent
Flasza et al.

(10) Patent No.: US 9,360,361 B2
(45) Date of Patent: Jun. 7, 2016

(54) SYSTEM AND METHOD FOR EMULSION MEASUREMENT AND PROFILING

(71) Applicant: Magnetrol International, Incorporated, Aurora, IL (US)

(72) Inventors: Michael D. Flasza, Schaumburg, IL (US); Feng Tang, Geneva, IL (US)

(73) Assignee: Magnetrol International, Inc., Aurora, IL (US)

( * ) Notice: Subject to any disclaimer, the term of this patent is extended or adjusted under 35 U.S.C. 154(b) by 444 days.

(21) Appl. No.: 14/036,504

(22) Filed: Sep. 25, 2013

(65) Prior Publication Data

US 2015/0084809 A1    Mar. 26, 2015

(51) Int. Cl.
*G01F 23/284*    (2006.01)

(52) U.S. Cl.
CPC .................................. *G01F 23/284* (2013.01)

(58) Field of Classification Search
CPC ... G01F 23/284; G01F 23/266; G01F 23/268; G01F 23/265; G01F 23/2845; G01R 27/06; G01R 27/2676; G01S 13/08
USPC ......................................... 342/124; 73/290 R
See application file for complete search history.

(56) References Cited

U.S. PATENT DOCUMENTS

| | | | | |
|---|---|---|---|---|
| 3,675,121 A * | 7/1972 | Thompson | ........... | G01N 27/221 324/659 |
| 3,778,706 A * | 12/1973 | Thompson | ........... | G01N 27/221 324/659 |
| 3,812,422 A * | 5/1974 | De Carolis | ............ | G01F 23/284 324/642 |
| 4,503,383 A * | 3/1985 | Agar | .................... | G01F 23/284 324/663 |
| 4,982,606 A | 1/1991 | Adamski et al. | | |
| 5,554,936 A | 9/1996 | Mohr | | |
| 5,819,582 A * | 10/1998 | Kelly | ..................... | G01R 27/06 324/642 |
| 6,318,172 B1 * | 11/2001 | Byatt | .................... | G01F 23/265 361/284 |
| 8,266,958 B2 | 9/2012 | Tanaka et al. | | |
| 2003/0117150 A1* | 6/2003 | Noik | ...................... | B01D 17/00 324/639 |
| 2007/0194799 A1* | 8/2007 | Carobbio | .............. | G01F 23/284 324/644 |
| 2009/0153150 A1* | 6/2009 | Slezak | .................. | G01F 23/266 324/663 |
| 2010/0153029 A1 | 6/2010 | Miskell et al. | | |
| 2012/0137767 A1* | 6/2012 | Silvermint | ........... | G01F 23/284 73/290 R |
| 2014/0084945 A1* | 3/2014 | Edvardsson | .......... | G01F 23/284 324/644 |

(Continued)

FOREIGN PATENT DOCUMENTS

| | | | | |
|---|---|---|---|---|
| DE | 102009002674 A1 * | 10/2010 | ............ | G01F 23/266 |
| DE | WO 2012079643 A1 * | 6/2012 | ............ | G01F 23/284 |

OTHER PUBLICATIONS

Publication entitled Eclipse Guided Wave Radar, 2012, Bulletin 57-100.6.

*Primary Examiner* — John B Sotomayor
(74) *Attorney, Agent, or Firm* — Wood, Phillips, Katz, Clark & Mortimer (57) ABSTRACT

There is disclosed herein a method of measuring and profiling a process liquid in a process vessel. The process liquid includes an emulsion layer between two media of differing dielectric constants. An electromagnetic signal is generated and transmitted along a probe, defining a transmission line, extending into the vessel. The transmission line comprises a conductor in contact with the process liquid with an insulating coating on the conductor to maximize signal penetration in the process liquid. A reflected signal is received from the transmission line and a programmed controller is operatively connected to the probe for measuring characteristics of reflected signal energy along the transmission line for profiling the emulsion layer.

27 Claims, 6 Drawing Sheets

(56) References Cited

U.S. PATENT DOCUMENTS

2014/0085133 A1* 3/2014 Flasza ................ G01F 23/284 342/124

2015/0084809 A1* 3/2015 Flasza ................ G01F 23/284 342/124

* cited by examiner

SYSTEM AND METHOD FOR EMULSION MEASUREMENT AND PROFILING

CROSS-REFERENCE TO RELATED APPLICATIONS

This application claims priority of provisional application No. 61/706,269, filed Sep. 27, 2012.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to use of a guided wave radar instrument for emulsion measurement and profiling.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wide-band (UWB) radar, in conjunction with advances in equivalent time sampling (ETS), permit development of low power and lost cost time domain reflectometry (TDR) instruments.

In a TDR instrument, a very fast pulse with a rise time of 500 picoseconds, or less, is propagated down a probe that serves as a transmission line, in a vessel. The pulse is reflected by a discontinuity caused by a transition between two media. For level measurement, that transition is typically where the air and the material to be measured meet. These instruments are also known as guided wave radar (GWR) measurement instruments.

One type of probe used by GWR level instruments is the coaxial probe. The coaxial probe consists of an outer tube and an inner conductor. When a coaxial probe is immersed in the liquid to be measured, there is a section of constant impedance, generally air, above the liquid surface. An impedance discontinuity is created at the level surface due to the change in dielectric constant of the liquid versus air at this point. When the GWR signal encounters any impedance discontinuity in the transmission line, part of the signal is reflected back toward the source in accordance with theory based on Maxwell's laws. The GWR instrument measures the time of flight of the electrical signal to, and back from, this reflecting point, being the liquid surface, to find the liquid level.

Simple level measurement involves detecting the reflected signal from a single level surface, such as water or oil. A slightly more complex measurement is so-called "interface" measurement, in which a less dense medium such as oil floats on top of a heavier medium such as water.

In many industrial processes, such as crude oil processing, tanks may contain both oil and water. However, the boundary between the oil and water may be poorly defined due to mixing of oil and water at the boundary. Instead of being sharp and well-defined, a layer of variable, potentially large, thickness consisting of an oil/water mix may exist. This "emulsion" layer typically starts out as a high percentage of oil mixed with a small percentage of water near the top. The percentage of water in the mix generally increases until the percentage of water in the mix is high and the percentage of oil low near the bottom of the emulsion layer, eventually becoming all water and no oil. Advantageously, it is desired to profile the emulsion as by measuring the oil/water mix inside the emulsion.

Known GWR level instruments are good at measuring the two distinct levels created by a clean interface situation. Emulsions are a different matter. Because there is no clear transition from the oil to the water when an emulsion exists, traditional GWR instruments may perform poorly in these situations. The poor performance is due to several factors, one of which may be the probe itself. In traditional GWR embodiments, the center conductor and outer tube of the coaxial probe are made of metal, such as stainless steel. When measuring a water surface, for example, 90% or more of the radar signal is reflected due to the high dielectric constant of water. The little bit of energy that does penetrate the surface is quickly dissipated by the water, a polar compound. In addition, unless very pure, water tends to be conductive. This is especially true for salt water, which is frequently present in many crude oil processing applications. If the probe is constructed of metal, the conducting liquid places a "short" across the probe and will conduct and thus dissipate the signal energy very rapidly at the surface. This blinds the measurement instrument to anything happening below the water surface.

This situation is very problematic to emulsion measurement. If the percentage of water in an oil/water mix is high, the radar signal will not penetrate very far into the emulsion and all hope of seeing the emulsion bottom is lost. This is one of the reasons traditional GWR instruments do not work well in emulsions. Too much of the signal energy is reflected and dissipated by the water near the emulsion top. If the radar signal is dissipated and lost in the water, then there is no chance to see through thick, watery emulsions.

The present invention is directed to solving one or more of the problems discussed above in a novel and simple manner.

SUMMARY

There is disclosed herein a method of improving signal penetration of an energy signal propagated down a transmission line for profiling an emulsion layer.

In accordance with one aspect, there is disclosed a method of measuring and profiling a process liquid in a process vessel, the process liquid including an emulsion layer between two media of differing dielectric constants, comprising: generating an electromagnetic signal; transmitting the generated electrical signal along a probe, defining a transmission line, extending into the vessel, the transmission line comprising a conductor in contact with the process liquid with an insulating coating on the conductor to maximize signal penetration in the process liquid; receiving a reflected signal from the transmission line; and operating a programmed controller operatively connected to the probe for measuring characteristics of reflected signal energy along the transmission line for profiling the emulsion layer.

There is disclosed in accordance with another aspect, a method of measuring and profiling a process liquid in a process vessel, the process liquid including an emulsion layer in a high conductivity liquid, comprising: generating an electromagnetic signal; transmitting the generated electrical signal along a probe, defining a transmission line, extending into the vessel, the transmission line comprising a conductor in contact with the process liquid with an insulating coating on the conductor to maximize signal penetration in the high conductivity liquid; receiving a reflected signal from the transmission line; and operating a programmed controller operatively connected to the probe for measuring characteristics of reflected signal energy along the transmission line for profiling the emulsion layer.

There is disclosed in accordance with a further aspect, a process measurement instrument for measuring and profiling a process liquid in a process vessel. The process liquid includes an emulsion layer between two media of differing dielectric constants. The instrument comprises a coaxial probe, defining a transmission line, comprising an inner conductor in an outer tube with a relatively thin insulating coating on the inner conductor to maximize signal penetration in the process liquid. A controller is electrically connected to the transmission line. The controller generates an electromagnetic signal on the transmission line and receives a reflected signal from the transmission line, and measures characteristics of reflected signal energy along the transmission line for profiling the emulsion layer.

Other features and advantages will be apparent from a review of the entire specification, including the appended claims and drawings.

DETAILED DESCRIPTION

Figures 1, 3:
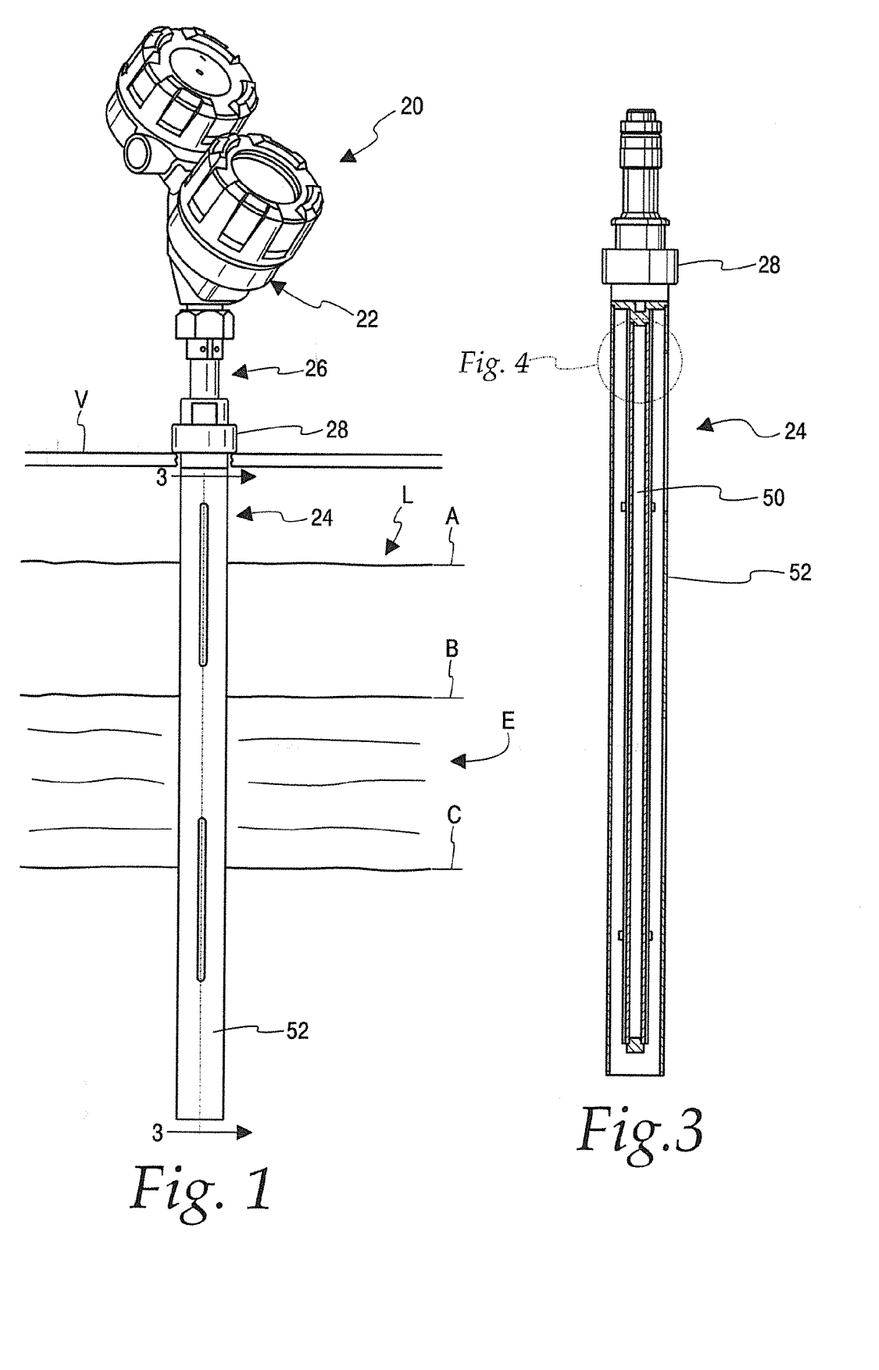
FIG. 1 is an elevation view of a guided wave radar instrument for emulsion measurement and profiling.
FIG. 3 is a cross-section of the probe for the instrument of FIG. 1 taken along the line 3-3 of FIG. 1.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters. For example, the instrument 20 could use a step excitation TDR signal or a pulsed continuous wave radar signal.

The process instrument 20 includes a control housing 22, a probe 24, and a connector 26 for connecting the probe 24 to the housing 22. The probe 24 is mounted to a process vessel V using an adaptor 28 that is part of the connector 26. The housing 22 is then secured to the probe 24 as by threading the connector 26 to the housing 22. The probe 24 comprises a high frequency transmission line which, when placed in a fluid, can be used to measure level of the fluid. Particularly, the probe 24 is controlled by a controller 30, see FIG. 2 and described below, in the housing 22 for determining level in the vessel V.

As described more particularly below, the controller 30 generates and transmits a signal on the probe 24. A reflected signal is developed at any impedance change. The instrument 20 is used herein for emulsion measurement and profiling. In an illustrative embodiment, the instrument 20 is described in connection with an oil layer above a water layer, with an emulsion layer of oil and water therebetween. Particularly, as illustrated in FIG. 1, the vessel V is illustrated containing a liquid L comprising an upper liquid surface at A for an oil layer, a level at B for the top of an emulsion layer E and a level at C for the bottom of the emulsion layer E and thus also the top of the water layer. Thus, the area between levels A and B represents oil, between levels B and C the emulsion, and below C is water. The process instrument 20 is adapted to measure and profile the oil/water mix inside the emulsion E.

Guided wave radar combines TDR, ETS and low power circuitry. TDR uses pulses of electromagnetic (EM) energy to measure distance or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. When the EM pulse is sent down the probe it meets the dielectric discontinuity and a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately five scans are taken per second.

Figure 2:
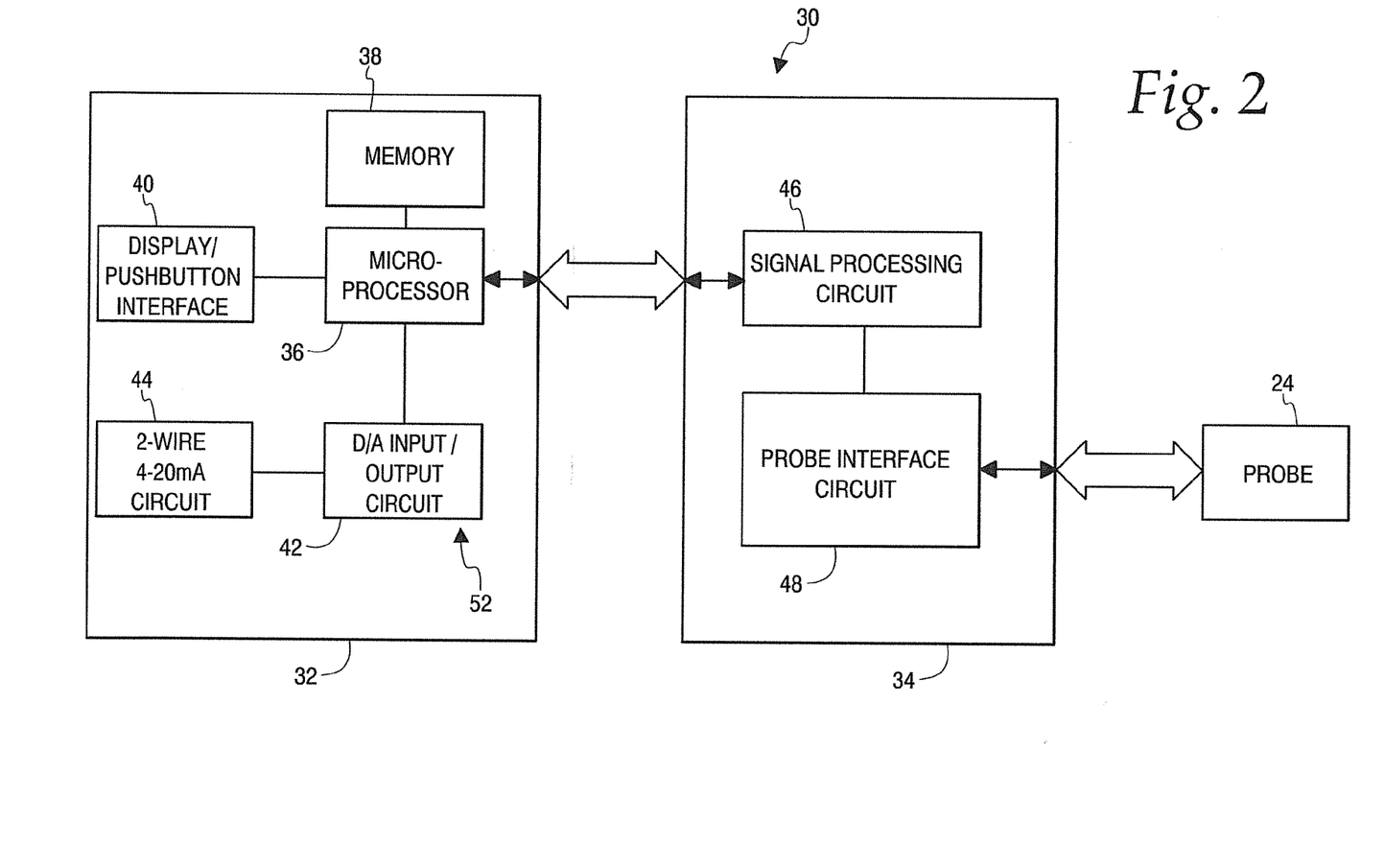
FIG. 2 is a block diagram of the instrument of FIG. 1.

Referring to FIG. 2, the electronic circuitry mounted in the housing 22 of FIG. 1 is illustrated in block diagram form as an exemplary controller 30 connected to the probe 24. As will be apparent, the probe 24 could be used with other controller designs. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 46 processes the ETS signals and provides a timed output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Figure 4:
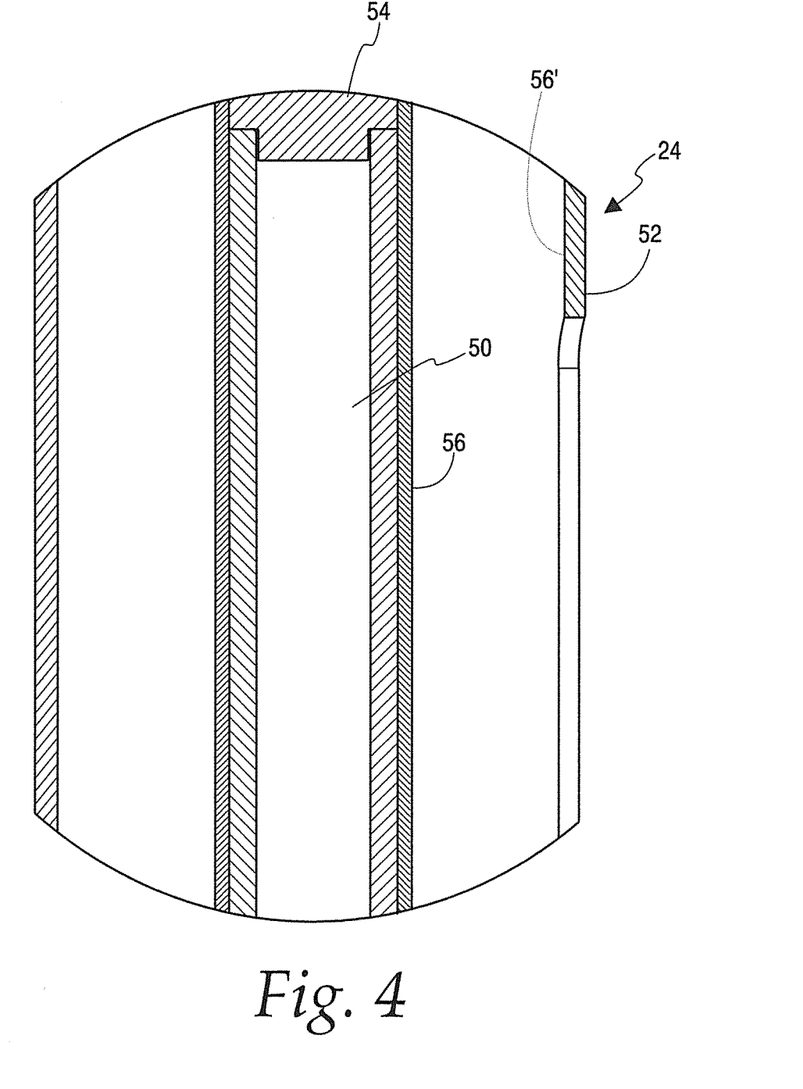
FIG. 4 is a detailed view taken from the probe of FIG. 3.

Referring to FIGS. 3 and 4, the probe 24 comprises a center conductor 50, which may be a solid rod or a tube, coaxially received in an outer tube 52. The center conductor 50 and outer tube 52 are typically constructed of stainless steel, although other materials may be used. The center conductor 50 is connected via a terminal 54 to an electrical conductor (not shown) for connection to the controller 30. The outer tube 52 is electrically connected in a known manner, such as via the connector 26 and housing 22 to the controller 30. An exemplary probe 24 may have an outer tube diameter of 1.75" and an inner conductor being a ½" diameter tube. Alternatively, the outer tube may have an outer diameter on the order of 0.875" with the inner conductor 50 being a ¼" diameter solid rod. In order to provide improved emulsion measurement and profiling the inner conductor 50 is coated with a relatively thin insulating sleeve 56. The insulating sleeve 56 has a thickness less than half of a diameter of the inner conductor 50. The sleeve 56 may be, for example, a TEFLON® coating in the range of 0.015" to 0.125" thick.

By coating the inner conductor 50 with an insulating coating, the electrical signal generated by the GWR instrument 20 penetrates farther into an industrial process containing oil, emulsion, and water, as shown in FIG. 1. This enables measurement of emulsion applications by allowing signal penetration to levels unattainable in systems without the coated inner conductor 50.

Particularly, with the use of standard uncoated probe, it is difficult to distinguish the end of the probe from the section containing water below the emulsion layer. This is because much of the signal energy is dissipated in the water along the length of the probe. If the signal is dissipated before reaching the end of the probe, the instrument loses the ability to see into emulsions with high water content. However, with the use of the coated center conductor, the end of the probe signal is readily distinguishable in the reflected signal as nearly all the signal energy has been returned to the controller 30 by the probe end and has not been dissipated or absorbed along the way.

The probe 24 is illustrated with a thin insulating coating defining the insulating sleeve 56 on the center conductor 50. Alternatively, the insulating coating can be provided as a sleeve, represented by a dashed line 56', on an inner surface of the outer tube 52, see FIG. 4, or as both a thin coating on the center conductor 50 and a thin coating on an inner surface of the outer tube 52. With all three alternatives, the insulating sleeve formed by the coating diminishes signal energy dissipated by water in the emulsion.

Figures 5, 6, 7:
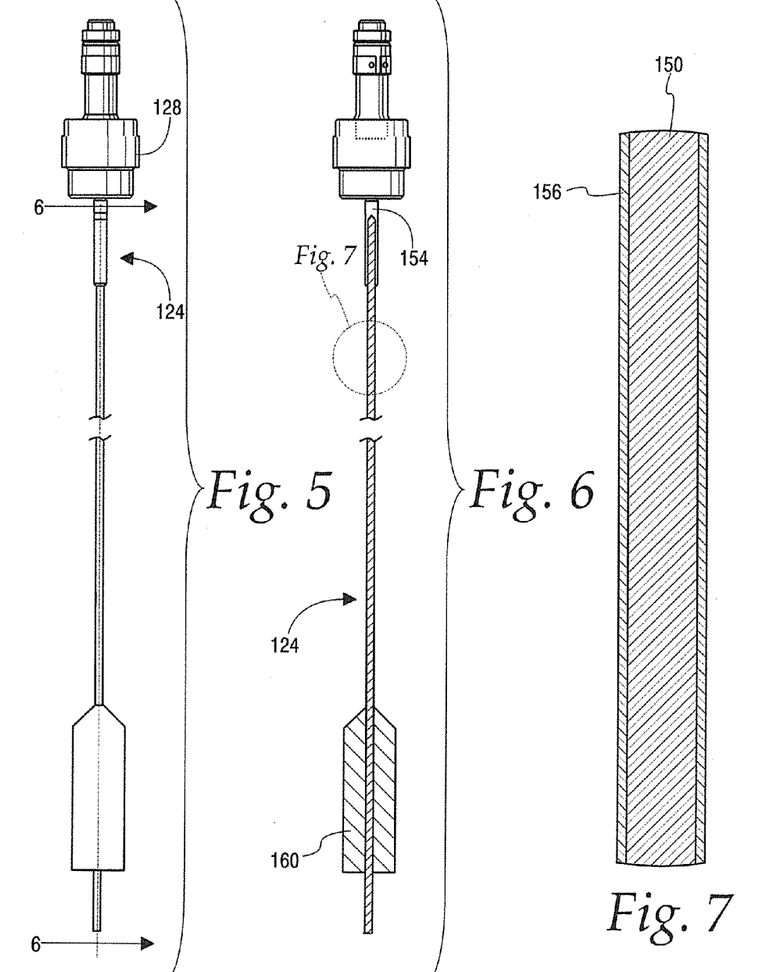
FIG. 5 is an elevation view of a single rod probe.
FIG. 6 is a sectional view along the line 6-6 of FIG. 5.
FIG. 7 is a detailed view taken from FIG. 6.
Figures 8, 9:
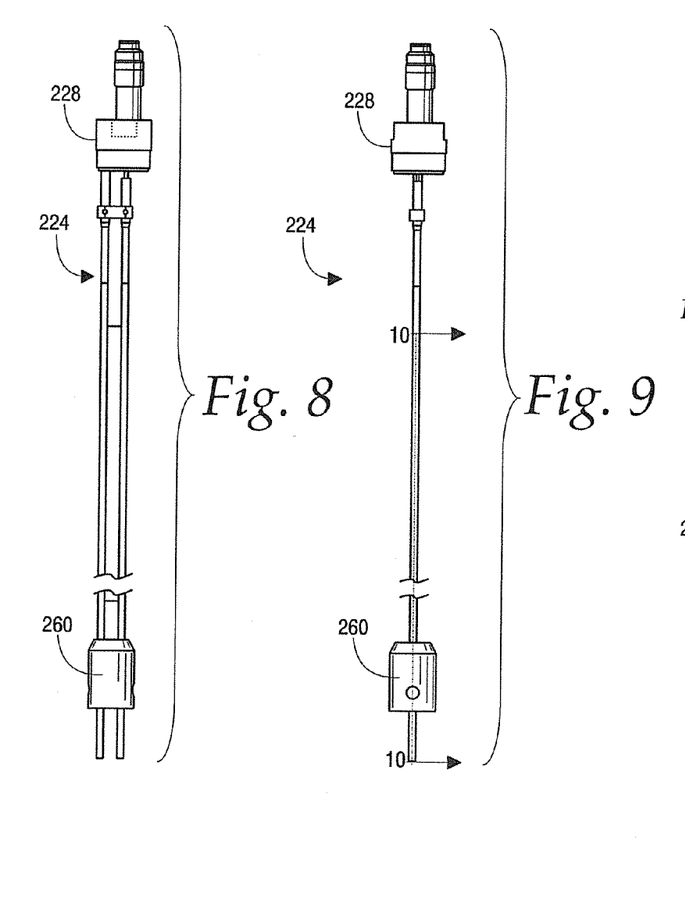
FIG. 8 is an elevation view of a twin rod probe.
FIG. 9 is a side elevation view of the twin rod probe of FIG. 8.
Figures 10, 11:
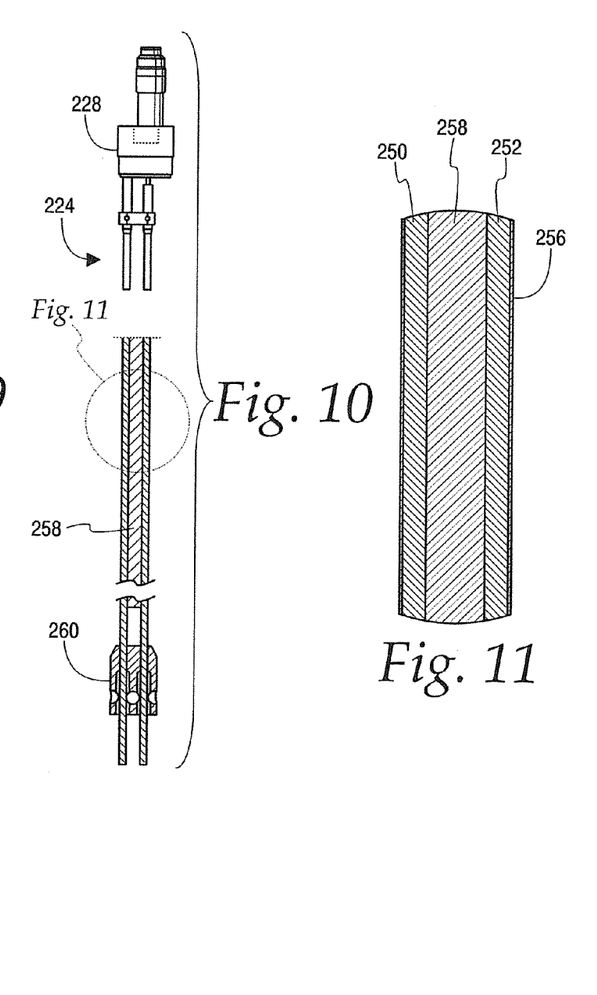
FIG. 10 is a sectional view taken along the line 10-10 of FIG. 9.
FIG. 11 is a detailed view taken from FIG. 10.

The use of a coated probe for emulsion measurement can be used with other types of probes. FIGS. 5-7 illustrate a single rod probe 124. For simplicity, elements similar to those with the probe 24, discussed above, use the similar reference numerals except for being in the 100 series. Thus, the single rod probe 124 comprises an adaptor 128 including a connector 154 for connecting to a conductor rod 150. The conductor rod 150 includes a thin insulating sleeve 156, as with the inner conductor 50 of the probe 24, discussed above. In the illustrated embodiment, the single conductor probe 124 comprises a flexible stainless steel cable for the conductor 150. A weight 160 is provided at the end of the cable to hang straight in a tank.

The conductor rod 150 may be on the order of ¼" diameter or ½ diameter according to the particular application and may be a cable or solid rod or tube, as necessary.

FIGS. 8-11 illustrate a probe 224 in the form of a twin rod probe. The twin rod probe 224 includes an adaptor 228 and first and second conductors 250 and 252 in the form of parallel conductor rods or cables. A thin insulating coating 256 surrounds the conductors 250 and 252 and forms a web 258 between the conductors 250 and 252. The conductors 250 and 252 can be flexible cables or solid rods or tubes, as necessary. A weight 260 may be provided for applications in which flexible cables are used, as above.

In laboratory testing, a 72" long uncoated coaxial probe was immersed in a vessel containing approximately 42" of water on the bottom with about 15" of mineral oil floating on top of the water. This left about 15" of air space on the probe above the oil. Because the end of the coaxial probe is open, the characteristic impedance of the probe should show an abrupt increase in impedance at its end. However, the end of the probe signal was barely distinguishable from the signal from the water layer. This is because most of the signal energy was dissipated in the water along the length of the probe. As a result, the instrument loses the ability to see into emulsions with high water content.

A similar test was conducted on a coaxial probe having a TEFLON® sleeve over the inner conductor rod. In this instance, the signal from the end of the probe is much larger than with the uncoated center rod probe. In fact, the TDR wave form indicates that nearly all the signal energy has been returned to the receiver by the probe end and is not dissipated or been absorbed along the way. In fact, for emulsion measurement and profiling the end of probe can be used as part of the measurements computed by the emulsion algorithm.

Figure 12:
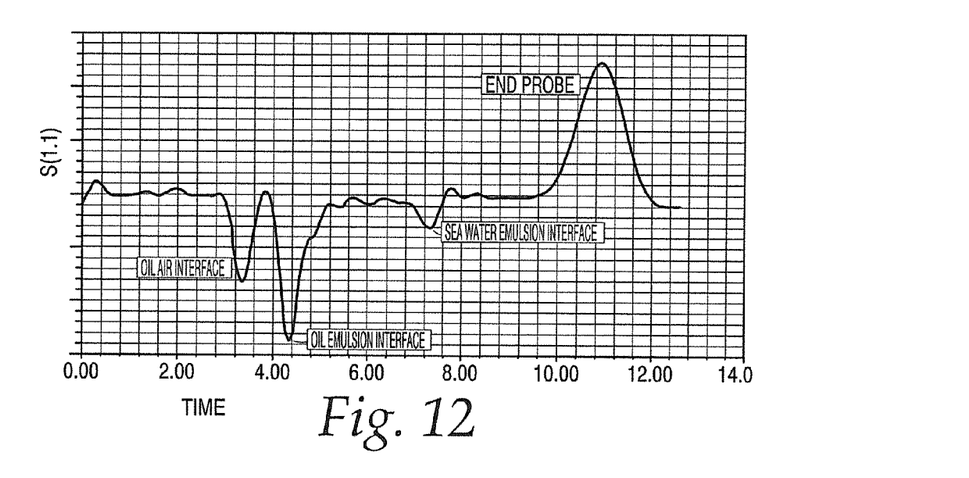
FIG. 12 is a curve illustrating an echo curve for the instrument of FIG. 1.
Figure 13:
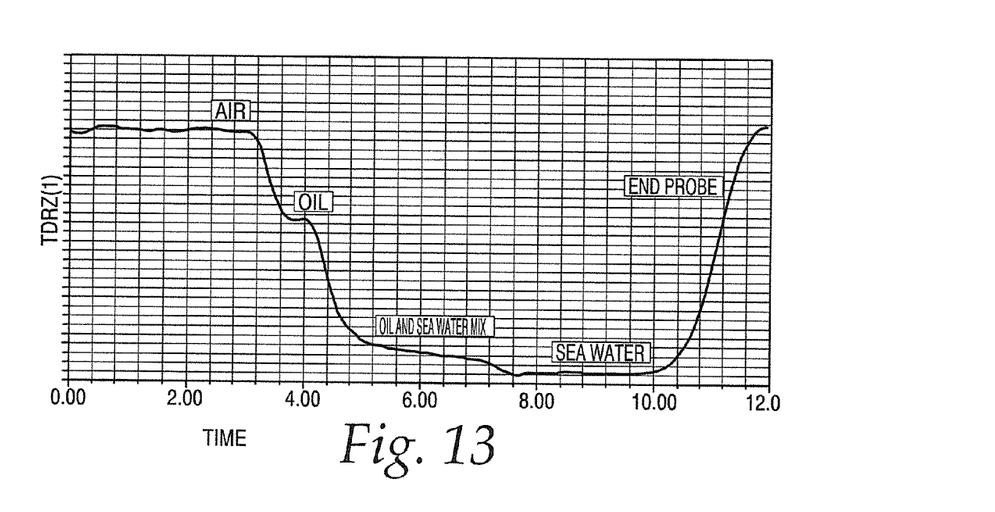
FIG. 13 is a time domain reflectometry curve obtained with the instrument of FIG. 1.

FIGS. 12 and 13 show simulation using high frequency simulation software with a model of the center coated rod probe in a simulated emulsion made of oil and salt water. FIG. 12 shows the simulation results in the form of an echo curve. FIG. 13 shows the simulation results in the form of a TDR curve. Both curves confirm that, by using a coaxial probe with an insulation sleeve over the center conductor, oil emulsions can be detected and measured even in the presence of sea water.

As described, the instrument 20 is used to implement a method of measuring and profiling a process liquid in a process vessel. The process liquid may include an emulsion layer between two media of differing dielectric constants, particularly, one being a high conductivity liquid. The method includes generating an electromagnetic signal via the analog circuit 34 of FIG. 2. The electromagnetic signal is transmitted along the probe 24, which defines a transmission line, extending into the vessel V. The transmission line comprises two conductors 50 and 52 in contact with the process liquid with an insulating coating 56 on one of the conductors to maximize signal penetration in the process liquid. The probe interface circuit 48 receives a reflected signal from the transmission line. The microprocessor 36 measures characteristics of reflected signal energy along the transmission line for profiling the emulsion layer. This enables the controller 30 to measure, for example, the oil/water mix in the emulsion.

As noted, the transmission line may be formed by two conductors in the form of the coaxial probe 24, the twin rod probe 224 or the single rod probe 124, with the vessel V functioning as the second conductor.

While any of the three types of probes discussed above can be used with the emulsion measurements, the coaxial probe 24 may be preferred in emulsion measurements as the coaxial probe has the highest sensitivity in the form of greatest reflected signal strength, among the various probe types. The actual material used to coat the probe would be selected based on chemical compatibility with the process. The material needs to be an electrical insulator as well. A generally acceptable material would be TEFLON® or variants thereof. However, other materials are possible. High temperature plastics or even ceramics might be needed in high temperature environments, greater than 400° F., for example.

The coating thickness is also an important design consideration and typically is a trade off. A thicker coating has a characteristic that more of the energy sent down the probe for the measurement will penetrate a high dielectric material such as salt water. Long probes, for example, would prefer a thicker coating so that pulse energy can propagate all the way to the end of the probe even when the probe is under water. However, emulsion measurement requires discerning between the small dielectric changes that result when the percent of oil in the water is low (less than approximately 20%). Measurement of small amounts of oil in water is aided by greater probe sensitivity to small dielectric changes, which is better accomplished with thin coatings.

Thus, as described herein, a level instrument used for emulsion measurement and profiling is provided with a coated probe to enable a measurement of emulsion situations by allowing signal penetration to levels unattainable in systems without a coated conductor.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the processes described herein do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method of measuring and profiling a process liquid in a process vessel, the process liquid including an emulsion layer between two media of differing dielectric constants, comprising:
   generating an electromagnetic signal;
   transmitting the generated electrical signal along a probe, defining a transmission line, extending into the vessel, the transmission line comprising a conductor in contact with the process liquid with an insulating coating on the conductors to maximize signal penetration in the process liquid;
   receiving a reflected signal from the transmission line; and
   operating a programmed controller operatively connected to the probe for measuring characteristics of reflected signal energy along the transmission line for profiling the emulsion layer.

2. The method of claim 1 wherein said probe comprises a coaxial probe having a center conductor in an outer tube.

3. The method of claim 2 wherein the probe center conductor includes the insulating coating.

4. The method of claim 1 wherein the probe comprises a twin rod probe with both of the rods including the insulating coating.

5. The method of claim 1 wherein the probe comprises a single rod probe with the rod including the insulating coating.

6. The method of claim 1 wherein the insulating coating has a thickness in a range of 0.015" to 0.125".

7. The method of claim 1 wherein generating an electromagnetic signal comprises generating a pulsed guided wave radar signal.

8. The method of claim 1 wherein generating an electromagnetic signal comprises generating a step excitation time domain reflectometry signal.

9. The method of claim 1 wherein generating an electromagnetic signal comprises generating a pulsed continuous wave radar signal.

10. The method of claim 1 wherein measuring characteristics of reflected signal energy along the transmission line comprises identifying an end of probe signal.

11. A method of measuring and profiling a process liquid in a process vessel, the process liquid including an emulsion layer in a high conductivity liquid, comprising:
    generating an electromagnetic signal;
    transmitting the generated electrical signal along a probe, defining a transmission line, extending into the vessel, the transmission line comprising a conductor in contact with the process liquid with an insulating coating on the conductor to maximize signal penetration in the high conductivity liquid;
    receiving a reflected signal from the transmission line; and
    operating a programmed controller operatively connected to the probe for measuring characteristics of reflected signal energy along the transmission line for profiling the emulsion layer.

12. The method of claim 11 wherein said probe comprises a coaxial probe having a center conductor in an outer tube.

13. The method of claim 12 wherein the probe center conductor includes the insulating coating.

14. The method of claim 11 wherein the probe comprises a twin rod probe with both of the rods including the insulating coating.

15. The method of claim 11 wherein the probe comprises a single rod probe with the rod including the insulating coating.

16. The method of claim 11 wherein the insulating coating has a thickness in a range of 0.015" to 0.125".

17. The method of claim 11 wherein generating an electromagnetic signal comprises generating a pulsed guided wave radar signal.

18. The method of claim 11 wherein generating an electromagnetic signal comprises generating a step excitation time domain reflectometry signal.

19. The method of claim 11 wherein generating an electromagnetic signal comprises generating a pulsed continuous wave radar signal.

20. The method of claim 11 wherein measuring characteristics of reflected signal energy along the transmission line comprises identifying an end of probe signal.

21. A process measurement instrument for measuring and profiling a process liquid in a process vessel, the process liquid including an emulsion layer between two media of differing dielectric constants, comprising:

a coaxial probe, defining a transmission line, comprising an inner conductor in an outer tube with a relatively thin insulating coating to maximize signal penetration in the process liquid;

a controller electrically connected to the transmission line, the controller generating an electromagnetic signal on the transmission line and receiving a reflected signal from the transmission line, and measuring characteristics of reflected signal energy along the transmission line for profiling the emulsion layer.

22. The measurement instrument of claim 20 wherein the inner conductor has a diameter in a range of 0.25"-0.50" and the insulating coating has a thickness in a range of 0.015"-0.125".

23. The measurement instrument of claim 20 wherein the inner conductor is a solid rod.

24. The measurement instrument of claim 20 wherein the inner conductor is a tube.

25. The measurement instrument of claim 20 wherein the insulating coating is on the center conductor.

26. The measurement instrument of claim 20 wherein the insulating coating is on an inner surface of the outer tube.

27. The measurement instrument of claim 20 wherein the insulating coating is on an inner surface of the outer tube and on the center conductor.

\* \* \* \* \*

UNITED STATES PATENT AND TRADEMARK OFFICE
CERTIFICATE OF CORRECTION

PATENT NO. : 9,360,361 B2  
APPLICATION NO. : 14/036504  
DATED : June 7, 2016  
INVENTOR(S) : Flasza et al.

Page 1 of 1

It is certified that error appears in the above-identified patent and that said Letters Patent is hereby corrected as shown below:

On the title page insert item (60)

-- Related U.S. Application Data

(60) Provisional Application No. 61/706,269, filed Sep. 27, 2012. --

Signed and Sealed this
Twenty-third Day of August, 2016

Michelle K. Lee
*Director of the United States Patent and Trademark Office*